(12) United States Patent
Igarashi et al.

(10) Patent No.: US 10,768,617 B2
(45) Date of Patent: Sep. 8, 2020

(54) DRIVE ASSISTANCE DEVICE AND DRIVE ASSISTANCE METHOD, AND MOVING BODY

(71) Applicant: SONY CORPORATION, Tokyo (JP)

(72) Inventors: Shinji Igarashi, Saitama (JP); Naoki Ide, Tokyo (JP); Kenta Kawamoto, Tokyo (JP); Takuya Fujita, Kanagawa (JP); Takashi Ogata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 65 days.

(21) Appl. No.: 15/773,389

(22) PCT Filed: Aug. 31, 2016

(86) PCT No.: PCT/JP2016/075478
§ 371 (c)(1),
(2) Date: May 3, 2018

(87) PCT Pub. No.: WO2017/085981
PCT Pub. Date: May 26, 2017

(65) Prior Publication Data
US 2018/0329414 A1 Nov. 15, 2018

(30) Foreign Application Priority Data

Nov. 19, 2015 (JP) ................................. 2015-226265

(51) Int. Cl.
*G05D 1/00* (2006.01)
*B60W 50/16* (2020.01)
(Continued)

(52) U.S. Cl.
CPC ........... *G05D 1/0061* (2013.01); *B60R 21/00* (2013.01); *B60W 30/182* (2013.01);
(Continued)

(58) Field of Classification Search
CPC .. G05D 1/0061; B60W 40/08; B60W 30/182; B60W 50/14; B60W 2540/26; G08G 1/16
See application file for complete search history.

(56) References Cited

U.S. PATENT DOCUMENTS 8,818,608 B2 * 8/2014 Cullinane ............. B60W 30/00
701/23
9,651,947 B2 * 5/2017 Kim ......................... A61B 5/18
(Continued)

FOREIGN PATENT DOCUMENTS

CN       101523455 A    9/2009
CN       101588757 A    11/2009
(Continued)

OTHER PUBLICATIONS

International Search Report and Written Opinion of PCT Application No. PCT/JP2016/075478, dated Oct. 18, 2016, 10 pages.
(Continued)

*Primary Examiner* — Michael J Zanelli
(74) *Attorney, Agent, or Firm* — Chip Law Group

(57) ABSTRACT

Provided is a drive assistance device for assisting driving of a vehicle by using an automatic driving function. Assuming various conditions of the driver, a plurality of notification timings to notify of switching from an automatic driving mode to a manual driving mode is set. Notifying a driver who is drowsing at a notification timing of long premature time allows the driver to have sufficient time margin to be ready for manual driving and to shift to driving action more safely. A driver who is reading a book or operating a smartphone is expected to be able to shift to driving action immediately after a notification, and thus it is sufficient to notify at a notification timing of short premature time, which can reduce inconvenience for the driver.

15 Claims, 7 Drawing Sheets

(51) Int. Cl.
  *B60W 30/182*  (2020.01)
  *B60R 21/00*   (2006.01)
  *G08G 1/16*    (2006.01)
  *B60W 50/14*   (2020.01)
  *B60W 40/08*   (2012.01)

(52) U.S. Cl.
  CPC ............ *B60W 40/08* (2013.01); *B60W 50/14* (2013.01); *B60W 50/16* (2013.01); *G05D 1/0088* (2013.01); *G08G 1/16* (2013.01); *B60W 2040/0827* (2013.01); *B60W 2540/26* (2013.01); *B60W 2756/10* (2020.02); *G05D 2201/0213* (2013.01)

(56) References Cited

U.S. PATENT DOCUMENTS

| | | | |
|---|---|---|---|
| 2010/0007480 | A1 | 1/2010 | Uozumi et al. |
| 2010/0214087 | A1 | 8/2010 | Nakagoshi et al. |
| 2015/0051781 | A1 | 2/2015 | Schnieders et al. |
| 2015/0066282 | A1 | 3/2015 | Yopp |
| 2016/0041553 | A1* | 2/2016 | Sato .................... B60W 30/143 701/23 |
| 2016/0107655 | A1* | 4/2016 | Desnoyer .............. B60W 50/14 701/23 |
| 2016/0132054 | A1* | 5/2016 | Eigel .................... B60W 50/14 701/23 |
| 2017/0028987 | A1* | 2/2017 | Yamada ................ B60W 50/08 |
| 2017/0220039 | A1* | 8/2017 | Funakawa ........... B60W 30/182 |
| 2017/0364070 | A1* | 12/2017 | Oba ...................... B60W 50/08 |
| 2017/0368936 | A1* | 12/2017 | Kojima ................ B60W 40/06 |
| 2018/0229743 | A1* | 8/2018 | Aoi ....................... B60W 50/14 |
| 2019/0004513 | A1* | 1/2019 | Chiba .................... B60T 7/22 |

FOREIGN PATENT DOCUMENTS

| | | |
|---|---|---|
| CN | 101968917 A | 2/2011 |
| DE | 102012112802 A1 | 6/2014 |
| DE | 102013009339 A1 | 12/2014 |
| EP | 2407947 A2 | 1/2012 |
| EP | 2848488 A1 | 3/2015 |
| JP | 2008-097446 A | 4/2008 |
| JP | 2008-181327 A | 8/2008 |
| JP | 2009-281832 A | 12/2009 |
| JP | 2010-264829 A | 11/2010 |
| JP | 2012-051498 A | 3/2012 |
| JP | 2014-106854 A | 6/2014 |
| JP | 2014-178971 A | 9/2014 |
| JP | 2015-044432 A | 3/2015 |
| JP | 2015-141560 A | 8/2015 |
| JP | 2015-210660 * | 11/2015 |
| WO | 2008/044119 A2 | 4/2008 |
| WO | 2008/090451 A2 | 7/2008 |
| WO | 2015/162764 A1 | 10/2015 |

OTHER PUBLICATIONS

Extended European Search Report of EP Patent Application No. 16865984.5, dated Oct. 26, 2018, 07 pages.

Office Action for JP Patent Application No. 2017-551555, dated Jun. 30, 2020, 5 pages of Office Action and 4 pages of English Translation.

* cited by examiner

DRIVE ASSISTANCE DEVICE AND DRIVE ASSISTANCE METHOD, AND MOVING BODY

CROSS REFERENCE TO RELATED APPLICATIONS

This application is a U.S. National Phase of International Patent Application No. PCT/JP2016/075478 filed on Aug. 31, 2016, which claims priority benefit of Japanese Patent Application No. JP 2015-226265 filed in the Japan Patent Office on Nov. 19, 2015. Each of the above-referenced applications is hereby incorporated herein by reference in its entirety.

TECHNICAL FIELD

A technology disclosed herein relates to a drive assistance device and a drive assistance method for assisting driving operation of a driver using an automatic driving function or other functions, and a moving body including a function of assisting driving of a driver.

BACKGROUND ART

Currently, navigation devices that provide travelling guidance to a destination are mounted in many vehicles. Moreover, in addition to manual driving for travelling on the basis of driving operation by a driver, development of drive assistance technologies of a vehicle are under way in recent years such as travelling automatically along a preset route (or a route to a destination guided by a navigation device) without requiring driving operation by a driver.

Demonstration experiments of automatic driving on public roads by vehicle manufacturers and the like have already begun. These experiments have unveiled various problems that may occur when automatic driving is performed, and a large number of proposals have been made to solve these problems.

For example, a proposal has been made on a travel assistance device that performs, when the automatic driving mode is started, switching from a manual driving mode to an automatic driving mode after a transition mode in which cancellation of the automatic driving mode is easy as compared with the automatic driving mode, detects override control by a driver when the automatic driving mode is cancelled, performs switching from the automatic driving mode to the manual driving mode when it is determined that the safety of a vehicle at the time of switching to the manual driving mode can be secured, and cancellation of the transition mode is performed in a case where override operation by the driver is detected (see Patent Document 1 for example).

Also, there has been proposed a drive assistance device that notifies the driver that switching from automatic driving to manual driving is recommended in a case where more than a certain number of surrounding vehicles travel, the ratio of the manually driven vehicles becomes high during automatic driving of the own vehicle, and automatic driving becomes difficult (see Patent Document 2 for example).

CITATION LIST

Patent Document

Patent Document 1: Japanese Patent Application Laid-Open No. 2010-264829

Patent Document 2: Japanese Patent Application Laid-Open No. 2015-44432

SUMMARY OF THE INVENTION

Problems to be Solved by the Invention

An object of the technology disclosed herein is to provide a drive assistance device, a drive assistance method, and a moving body capable of suitably assisting driving operation of a driver using an automatic driving function.

Solutions to Problems

The technology disclosed herein has been devised in consideration of the aforementioned problems. A first aspect of the technology is a drive assistance device, including: a condition detector configured to detect condition of a driver; and a control unit configured to control a timing to notify of switching of driving modes of a vehicle on the basis of a detection result by the condition detector.

According to a second aspect of the technology disclosed herein, the control unit of the drive assistance device according to the first aspect is configure to control a timing to notify of switching of the vehicle from an automatic driving mode to a manual driving mode.

According to a third aspect of the technology disclosed herein, the control unit of the drive assistance device according to the second aspect is configure to set premature time to perform the notification depending on whether the driver is ready to perform manual driving.

According to a fourth aspect of the technology disclosed herein, in second condition in which the driver's attention is distracted, the control unit of the drive assistance device according to the third aspect is configured to set premature time longer than that in first condition in which the driver is conscious but is performing another work.

According to a fifth aspect of the technology disclosed herein, in third condition in which the driver is drowsing or away from a driver's seat, the control unit of the drive assistance device according to the fourth aspect is configure to set premature time even longer than that in the second condition.

According to a sixth aspect of the technology disclosed herein, the control unit of the drive assistance device according to the third aspect is configure to further control a method of notifying of switching of the driving modes of the vehicle on the basis of the detection result by the condition detector.

According to a seventh aspect of the technology disclosed herein, the control unit of the drive assistance device according to the sixth aspect is configure to control the notification method further considering time or distance to switching the vehicle from the automatic driving mode to the manual driving mode.

According to the eighth aspect of the technology disclosed herein, the drive assistance device according to the sixth aspect includes a notification unit that uses a plurality of means of notifying of switching of the driving modes of the vehicle. In addition, the control unit is configure to perform the notification method in which more of the plurality of means are combined in a case where there is no margin in time or distance to switching the vehicle from the automatic driving mode to the manual driving mode.

According to a ninth aspect of the technology disclosed herein, the notification unit of the drive assistance device according to the eighth aspect can use at least two out of audio output, image display, presentation of a kinesthetic sense or a tactile sense, and an information terminal held by a passenger of the vehicle.

According to a tenth aspect of the technology disclosed herein, the control unit of the drive assistance device according to the first aspect is configure to detect condition of the driver after the notification is performed and to further control the switching of the driving modes of the vehicle on the basis of the detection result.

According to an eleventh aspect of the technology disclosed herein, the control unit of the drive assistance device according to the first aspect is configure to set a timing to switch the vehicle from an automatic driving mode to a manual driving mode in response to a request from the driver.

According to a twelfth aspect of the technology disclosed herein, the control unit of the drive assistance device according to the first aspect is configure to communicate information regarding the performance of the switching the vehicle from an automatic driving mode to a manual driving mode to a surrounding vehicle or an external device.

According to a thirteenth aspect of the technology disclosed herein, in a case where reaction of a first passenger to the notification of the switching the vehicle from an automatic driving mode to a manual driving mode cannot be confirmed, the control unit of the drive assistance device according to the first aspect is configured to set a second passenger of the vehicle as a new driver and to control a timing to notify of switching of the driving modes on the basis of a detection result of the second passenger by the condition detector.

In addition, a fourteenth aspect of the technology disclosed herein is a drive assistance method, including:

a condition detecting step of detecting condition of a driver; and a control step of controlling a timing to notify of switching of driving modes of a vehicle on the basis of a detection result in the condition detecting step.

Further, a fifteenth aspect of the technology disclosed herein is a moving body, including:

a driving unit configured to be driven to travel in one of a plurality of driving modes;

a condition detector configured to detect condition of a driver; and a control unit configured to control a timing to notify of switching of driving modes of the driving unit on the basis of a detection result by the condition detector.

Effects of the Invention

According to the technology disclosed herein, it is possible to provide an excellent drive assistance device, a drive assistance method, and a moving body capable of notifying of switching to manual driving at the optimal timing by the optimal method depending on the condition of a driver when the moving body is switched from automatic driving to the manual driving.

Note that the effects described herein are merely examples, and effects of the present invention are not limited thereto. Furthermore, the present invention may further exert additional effects in addition to the above effects.

Other objects, features, or advantages of the technology disclosed herein will become clear from further detailed descriptions based on embodiments or accompanying drawings which will be described later.

MODE FOR CARRYING OUT THE INVENTION

Hereinafter, embodiments of the technology disclosed herein will be described in detail with reference to the drawings.

Figure 1:
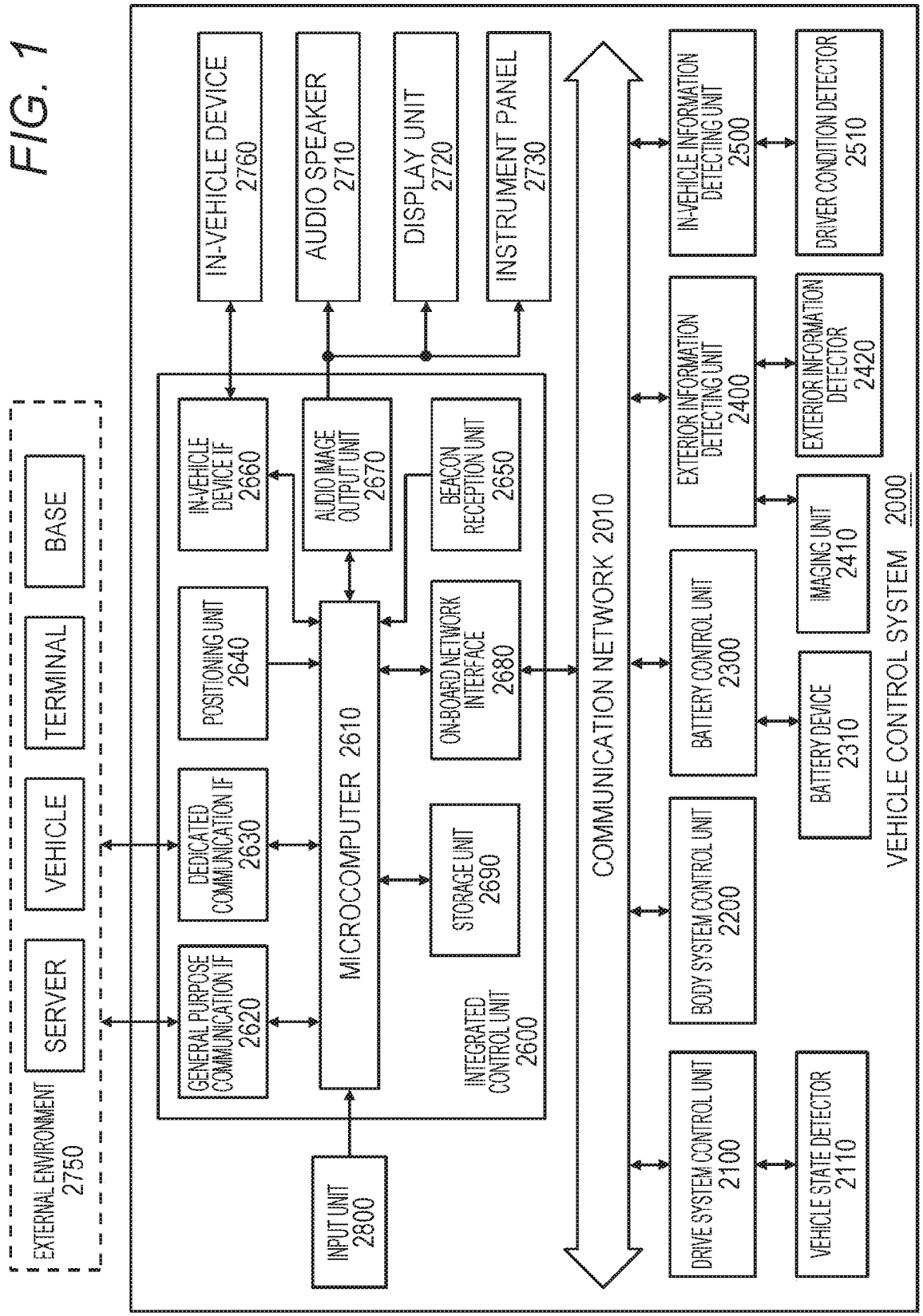
FIG. 1 is a diagram schematically illustrating a configuration example of a vehicle control system 2000 to which the technology disclosed herein can be applied.

FIG. 1 is a diagram schematically illustrating a configuration example of a vehicle control system 2000 to which the technology disclosed herein can be applied. The illustrated vehicle control system 2000 includes a plurality of control units such as a drive system control unit 2100, a body system control unit 2200, a battery control unit 2300, an exterior information detecting unit 2400, an in-vehicle information detecting unit 2500, and an integrated control unit 2600. These control units are interconnected via a communication network 2010. The communication network 2010 may be, for example, an on-board communication network compliant with a desired communication standard such as a controller area network (CAN), a local interconnect network (LIN), a local area network (LAN), or FlexRay (registered trademark).

Each of the control units 2100 to 2600 includes, for example, a microcomputer which performs calculation processing in accordance with various programs, a storage unit which stores a program executed by the microcomputer or parameters and the like used for various calculations, and a driving circuit which drives a device of various types to be controlled. Furthermore, each of the control units 2100 to 2600 includes a network interface (IF) for communicating with another control unit via the communication network 2010 and also includes a communication interface for performing communication by wired communication or wireless communication with a device, a sensor or the like onboard or outside a vehicle.

The drive system control unit 2100 controls operation of a device related to a driving system of the vehicle in accordance with various programs. For example, the drive system control unit 2100 functions as control device such as a driving force generating device for generating driving force of the vehicle such as an internal combustion engine or a driving motor, a driving force transmission mechanism for transmitting driving force to wheels, a steering mechanism for adjusting a steering angle of the vehicle, and a braking device for generating braking force of the vehicle. Furthermore, the drive system control unit 2100 may have a function as a control device such as an antilock brake system (ABS) or an electronic stability control (ESC).

The drive system control unit 2100 is connected with a vehicle condition detector 2110. The vehicle condition detector 2110 includes, for example, at least one of a gyrosensor for detecting an angular velocity of axial rotation motion of the vehicle body, an acceleration sensor for detecting acceleration of the vehicle, and a sensor for detecting an operation amount of an acceleration pedal, an operation amount of a brake pedal, a steering angle of a steering wheel, an engine speed, a rotation speed of wheels, and the like. The drive system control unit 2100 performs calculation processing using a signal input from the vehicle condition detector 2110 and controls an internal combustion engine, a driving motor, an electric power steering device, a brake device, and the like.

The body system control unit 2200 controls operation of various devices mounted to the vehicle body in accordance with various programs. For example, the body system control unit 2200 functions as a control device related to locking and unlocking of a door lock such as a keyless entry system or a smart key system and to starting and halting of the system 2000 and as a control device of a power window device and various types of lamps (including a head lamp, a back lamp, a brake lamp, an indicator, and a fog lamp. When a radio wave transmitted from a portable transmitter built in a key (or replacing a key) or a signal of various switches arrives, the body system control unit 2200 controls a door lock device, a power window device, a lamp, and the like of the vehicle.

The battery control unit 2300 controls a secondary battery that is a power supply source of the driving motor in accordance with various programs. For example, a battery device 2310 including a secondary battery measures the temperature, an output voltage, the remaining capacity, and the like of the secondary battery and outputs the measured values to the battery control unit 2300. The battery control unit 2300 performs calculation processing using input information from the battery device 2310 and performs control such as temperature adjustment control of the secondary battery and control of a cooling device or other devices mounted to the battery device 2310.

The exterior information detecting unit 2400 detects exterior information of the vehicle mounted to the vehicle control system 2000. For example, the exterior information detecting unit 2400 is connected with at least one of the imaging unit 2410 and the exterior information detector 2420.

The imaging unit 2410 includes at least one of a time of flight (ToF) camera, a stereo camera, a monocular camera, an infrared camera, and other cameras. The exterior information detector 2420 includes at least one of an environmental sensor for detecting the current weather or meteorological phenomena and an ambient information detecting sensor for detecting a surrounding vehicle, an obstacle, a pedestrian, for example.

The environmental sensor referred to here is, for example, a raindrop sensor detecting rainy weather, a fog sensor for detecting fog, a sunshine sensor detecting the degree of sunshine, a snow sensor for detecting snowfall, or other sensors. Furthermore, the ambient information detecting sensor includes an ultrasonic sensor, a radar device, a light detection and ranging/laser imaging detection and ranging (LIDAR) device, and other devices.

The imaging unit 2410 and the exterior information detector 2420 may be configured as separate sensors or devices or may be configured as a device in which a plurality of sensors or devices are integrated.

Figure 2:
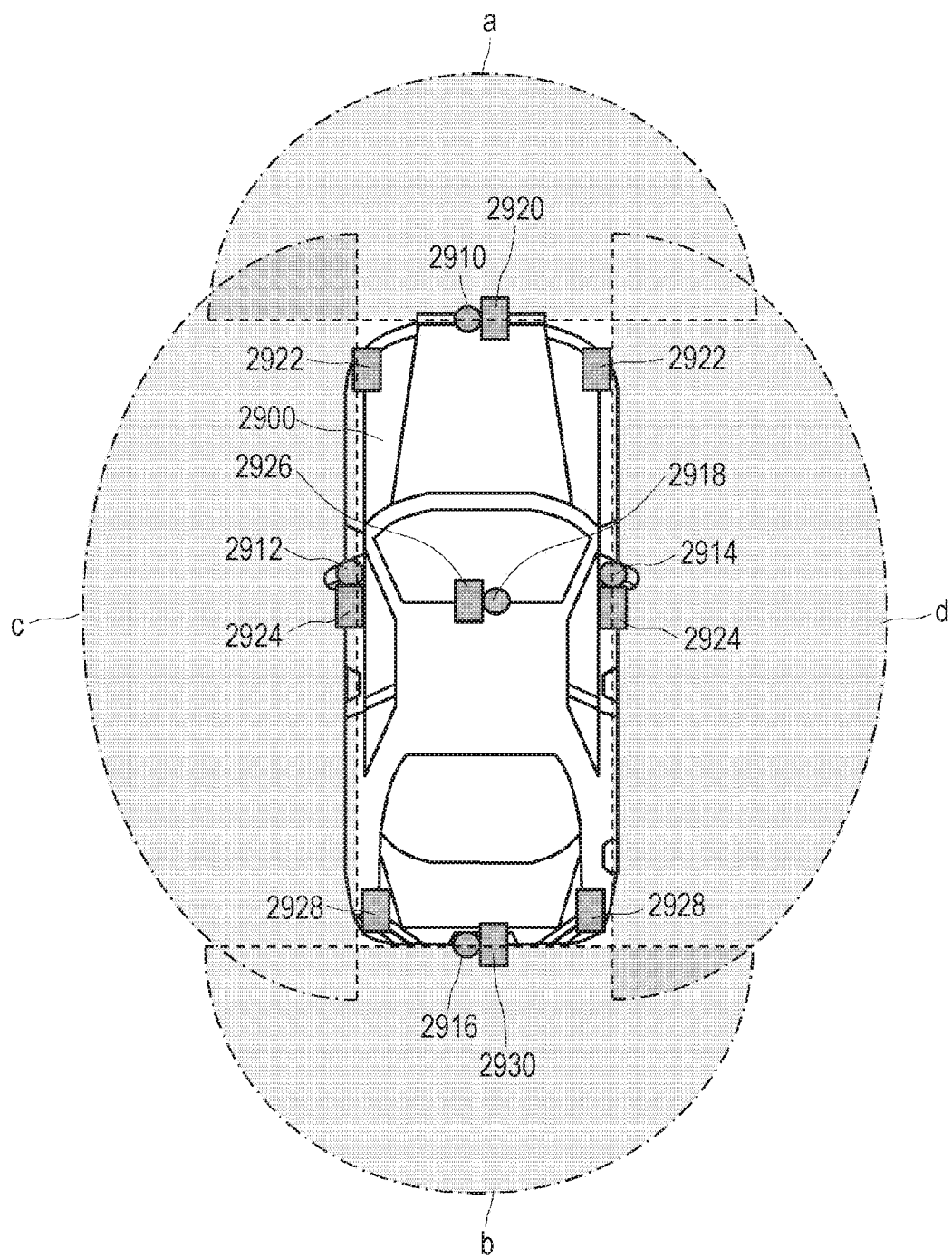
FIG. 2 is a diagram illustrating an example of installation positions of an imaging unit 2410 and an exterior information detector 2420.

An example of installation positions of the imaging unit 2410 and the exterior information detector 2420 is illustrated in FIG. 2. In the figure, each of imaging units 2910, 2912, 2914, 2916, and 2918 corresponds to the imaging unit 2410 and is installed at at least one position out of a front nose, side mirrors, a rear bumper, and a back door and an upper part of a windshield in the interior of a vehicle 2900, for example. The imaging unit 2910 provided at the front nose and the imaging unit 2918 provided at the upper part of the windshield in the vehicle interior mainly capture an image ahead of the vehicle 2900. For example, it is possible to detect a preceding vehicle, a pedestrian, an obstacle, a traffic signal, a traffic sign, a lane, and the like on the basis of the image ahead of the vehicle 2900 captured by the imaging unit 2918. In addition, the imaging units 2912 and 2914 provided at the side mirrors mainly capture images on the sides of the vehicle 2900. In addition, the imaging unit 2916 provided at the rear bumper or the back door mainly captures an images in the back of the vehicle 2900.

Note that in FIG. 2 an imaging range a represents an imaging range of the imaging unit 2910 provided at the front nose, imaging ranges c and d represent imaging ranges of the imaging units 2912 and 2914 provided at the left and the right side mirrors, respectively, and an imaging range b indicates an imaging range of the imaging unit 2916 provided at the rear bumper or the back door. For example, by overlapping the image data captured by the imaging units 2910, 2912, 2914, and 2916, an overhead view image of the vehicle 2900 viewed from above can be obtained.

Respective exterior information detectors 2920, 2922, 2924, 2926, 2928, and 2930 provided at the front, the rear, the sides, the corners, and the upper part of the windshield in the interior of the vehicle 2900 includes an ultrasonic sensor or a radar device, for example. The exterior information detectors 2920, 2926, and 2930 provided at the front nose, the rear bumper, the back door, and the upper part of the windshield in the interior of the vehicle 2900 may be, for example, LIDAR devices. The exterior information detectors 2920 to 2930 are mainly used for detecting a preceding vehicle, a pedestrian, an obstacle, or the like.

Referring back to FIG. 1, the configuration of the vehicle control system 2000 will be further described. The exterior information detecting unit 2400 causes the imaging unit 2410 to capture an image outside the vehicle (see FIG. 2) and receives the captured image data from the imaging unit 2410. The exterior information detecting unit 2400 further receives detection information from the exterior information detector 2420. In a case where the exterior information detector 2420 is an ultrasonic sensor, a radar device, or an LIDAR device, the exterior information detecting unit 2400 transmits ultrasonic waves, electromagnetic waves or the like and also receives information regarding reflected waves from the exterior information detector 2420.

The exterior information detecting unit 2400 may perform image recognition processing for recognizing surrounding people, vehicles, obstacles, signs, characters on a road surface, or the like, object detection processing for detecting an object outside the vehicle, and distance detection processing to an object outside the vehicle may be performed on the basis of information received from the exterior information detector 2420. Moreover, the exterior information detecting unit 2400 may perform environment recognition processing for recognizing rainfall, fog, road surface condition, or the like on the basis of the information received from the exterior information detector 2420.

Note that the exterior information detecting unit 2400 may perform processing such as distortion correction or alignment on the image data received from the imaging unit 2410 and generate an overhead view image or a panorama image by combining image data captured by different imaging units 2410. Moreover, the exterior information detecting unit 2400 may perform viewpoint converting processing using image data captured by different image capturing units 2410.

The in-vehicle information detecting device 2500 detects information inside the vehicle. The in-vehicle information detecting device 2500 is connected with, for example, a driver condition detector 2510 for detecting condition of the driver driving the vehicle (hereinafter simply referred to as "driver"). The in-vehicle information detecting device 2500 detects information inside the vehicle on the basis of driver condition information input from the driver condition detector 2510. For example, the in-vehicle information detecting device 2500 may calculate the degree of fatigue or the degree of concentration of the driver or determines whether the driver is drowsing. Moreover, the in-vehicle information detecting device 2500 detects various driver conditions and determines whether the driver (or a passenger other than the driver) can drive the vehicle (described later). Here, the driver referred to means a passenger seated at a driver's seat or a passenger who is stored as the person to drive in the integrated control unit 2600 from among passengers in the vehicle. The in-vehicle information detecting device 2500 may detect a driver in accordance with a position where the passenger is seated or may determine a driver by comparing a face image captured and a face image registered as a driver in advance on the basis of a face of a passenger included in the image capturing the interior of the vehicle.

The driver condition detector 2510 may include a camera for capturing a driver (driving monitor camera), a biosensor for detecting biological information of a driver, a microphone for collecting sound in the interior of the vehicle, and other devices. The in-vehicle information detecting device 2500 may perform signal processing such as noise canceling on sound signals collected by the microphone. The biosensor is provided on, for example, a seat surface, a steering wheel or the like and detects a driver holding a steering wheel or biological information of the driver holding the steering wheel. Moreover, the driver condition detector 2510 may include a load sensor for detecting a load applied to a driver's seat or other seats (whether a person is seated on a seat). The driver condition detector 2510 may further detect the condition of the driver on the basis of operations of various devices for the driver to operate the vehicle such as an accelerator, a brake, a steering wheel, a wiper, an indicator, an air conditioner, and other switches. The driver condition detector 2510 may further check a status such as that the driver is not carrying a driver's license or refuses to drive.

The integrated control unit 2600 controls the overall operation in the vehicle control system 2000 in accordance with various programs. In the example illustrated in FIG. 1, the integrated control unit 2600 includes a microcomputer 2610, a general purpose communication interface 2620, a dedicated communication interface 2630, a positioning unit 2640, a beacon reception unit 2650, an in-vehicle device interface 2660, an audio image output unit 2670, an on-board network interface 2680, and a storage unit 2690. The integrated control unit 2600 is further connected with an input unit 2800. By operating the input unit 2800, passengers can input various data and instruct processing operations to the vehicle control system 2000.

The input unit 2800 includes a device that can be operated to input by a driver or other passengers such as a touch panel, a button, a microphone, a switch, and a lever, for example. The input unit 2800 may be, for example, a remote control device that uses infrared rays or other radio waves or may be an externally connected device such as a mobile phone compatible with operations of the vehicle control system 2000, a personal digital assistant (PDA), a smartphone, and a tablet. The input unit 2800 may be, for example, a camera, and in this case a passenger can input information to the integrated control unit 2600 by gesture. Furthermore, the input unit 2800 may include, for example, an input control circuit or other circuits that generate an input signal on the basis of the information input by passengers using the above input unit 2800 and output the input signal to the integrated control unit 2600.

The storage unit 2690 may include a random access memory (RAM) that stores various programs to be executed by the microcomputer and an electrically erasable and programmable read only memory (EEPROM) that stores various parameters, calculation results, detection values of sensors, and the like. Moreover, the storage unit 2690 may be a magnetic storage device such as a hard disc drive (HDD), a semiconductor storage device such as a solid state drive (SSD), an optical storage device, or a magneto-optical storage device, or the like.

The general purpose communication interface 2620 mediates communication with various devices present in external environment 2750. The general purpose communication interface 2620 implements a cellular communication protocol such as Global System of Mobile communications (GSM), WiMAX, Long Term Evolution (LTE) or LTE-Advanced (LTE-A), a wireless LAN such as Wi-Fi (registered trademark), and other wireless communication protocols such as Bluetooth (registered trademark). The general purpose communication interface 2620 can be connected to a device (e.g. application server, control server, management server (described later), and the like) present in an external network (e.g. the Internet, a cloud/network, or a company-specific network) via a base station of cellular communication, an access point of wireless LAN, or the like, for example. Furthermore, the general purpose communication interface 2620 may be connected to a terminal (e.g. information terminal carried by a driver or a pedestrian, shop terminal installed in a shop adjacent to a road on which the vehicle is traveling, machine type communication (MTC) terminal (such as a household gas meter or a vending machine) connected to a communication network without human intervention, or the like using the peer to peer (P2P) technology.

The dedicated communication interface 2630 is a communication interface supporting a communication protocol established for use in a vehicle. For example, the dedicated communication interface 2630 may implement standard protocols such as Wireless Access in Vehicle Environment (WAVE), which is a combination of IEEE 802.11p of a lower layer and IEEE 1609 of an upper layer, Dedicated Short Range Communications (DSRC), and a cellular communication protocol. Typically, the dedicated communication interface 2630 performs V2X communication which is a concept including at least one of vehicle to vehicle communication, vehicle to infrastructure communication, vehicle to home communication, and vehicle to pedestrian communication.

The positioning unit 2640 receives, for example, global navigation satellite system (GNSS) signals (e.g. global positioning system (GPS) signals from GPS satellites) from GNSS satellites, executes positioning, and generates position information including the latitude, the longitude, and the altitude of the vehicle. Note that the positioning unit 2640 may specify the current position on the basis of electric measurement information from a wireless access point using PlaceEngine or the like or may acquire position information from a portable terminal held by a passenger such as a cellular phone, a personal handy-phone system (PHS), or a smartphone a having a positioning function.

The beacon reception unit 2650 receives radio waves or electromagnetic waves transmitted from a radio station or other facilities installed on a road and acquires the current position of the vehicle and or traffic information (information such as congestion, road closure, required time), for example. Note that the function of the beacon reception unit 2650 may be implemented while included in the dedicated communication interface 2630 described above.

The in-vehicle device interface 2660 is a communication interface that mediates connection among the microcomputer 2610 and various in-vehicle devices 2760 present in the vehicle. The in-vehicle device interface 2660 may establish a wireless connection using a wireless communication protocol such as wireless LAN, Bluetooth (registered trademark), near field communication (NFC), or wireless Universal Serial Bus (USB) (WUSB). Furthermore, the in-vehicle device interface 2660 may establish wired connection such as a wired network such as USB, High Definition Multimedia Interface (HDMI) (registered trademark), and Mobile High-definition Link (MHL) via a connection terminal (and a cable if necessary) (not illustrated). The in-vehicle device interface 2660 exchanges control signals or data signals with, for example, a mobile device or a wearable device held by a passenger or an in-vehicle device 2760 carried into or attached to the vehicle. The in-vehicle devices 2760 may include a haptic device that presents a kinesthetic sense or a tactile sense to a driver or a fellow passenger via a seat or other items.

The on-board network interface 2680 is an interface that mediates communication between the microcomputer 2610 and the communication network 2010. The on-board network interface 2680 transmits and receives signals or the like in accordance with a predetermined protocol supported by the communication network 2010.

The microcomputer 2610 of the integrated control unit 2600 controls the vehicle control system 2000 according to various programs on the basis of information acquired via at least one of the general purpose communication interface 2620, the dedicated communication interface 2630, the positioning unit 2640, the beacon reception unit 2650, the in-vehicle device interface 2660, and the on-board network interface 2680.

For example, the microcomputer 2610 may calculate a control target value of the driving force generating device, the steering mechanism, or the braking device on the basis of acquired information regarding the inside and the outside of the vehicle and output a control command to the drive system control unit 2100. For example, the microcomputer 2610 may perform cooperative control aiming at collision avoidance or alleviation of an impact of a vehicle, following travelling based on a distance between vehicles, travelling while maintaining a vehicle speed, automatic driving, or the like. Moreover, the microcomputer 2610 may perform automatic driving control of the vehicle by outputting a control command to the drive system control unit 2100. Moreover, the microcomputer 2610 may perform control of a notification timing (described later) to notify of switching from an automatic driving mode to a manual driving mode on the basis of the driver condition determined on the basis of the detection result by the driver condition detector 2510.

Moreover, the microcomputer 2610 may create local map information including information of the vicinity of the current position of the vehicle on the basis of information acquired via at least one of the general purpose communication interface 2620, the dedicated communication interface 2630, the positioning unit 2640, the beacon reception unit 2650, the in-vehicle device interface 2660, and the on-board network interface 2680. Moreover, the microcomputer 2610 may generate a warning signal by predicting danger such as collision of the vehicle, an approaching pedestrian, a building or other objects, or entry into a road that is closed on the basis of the acquired information. The warning signal referred to here is, for example, a signal for generating alarm sound or turning on a warning lamp.

The audio image output unit 2670 transmits at least one of audio and image output signals to an output device capable of visually or audibly notifying a passenger or the outside of the vehicle of information. In the example illustrated in FIG. 1, an audio speaker 2710, a display unit 2720, and an instrument panel 2730 are mounted as output devices.

The display unit 2720 may include at least one of, for example, an on-board display or a head-up display. The head-up display is a device that displays an image (as is formed at a point in the infinity) in the field of view of a driver using the windshield. The display unit 2720 may have an augmented reality (AR) display function. In addition to the above, a headphone, a projector, a lamp, or the like may be included in the vehicle as an output device. In a case where the output device is a display device, the display device visually displays results obtained by various processing performed by the microcomputer 2610 or information received from other control units in various forms such as a text, an image, a table, and a graph. Alternatively, in a case where the output device is an audio output device, the audio output device audibly outputs an analog signal by converting an audio signal including reproduced audio data, acoustic data or the like into the analog signal.

In addition, the instrument panel 2730 is disposed in front of the driver's seat (as well as the front passenger's seat) and includes a meter panel for indicating information necessary for travelling of the vehicle such as a speedometer, a tachometer, a fuel gauge, a water temperature gauge, and a distance meter and a navigation system that provides travelling guidance to a destination.

Note that at least two control units out of the plurality of control units included in the vehicle control system 2000 illustrated in FIG. 1 may be physically integrated into one unit. The vehicle control system 2000 may further include a control unit other than those illustrated in FIG. 1. Moreover, at least one of the control units 2100 to 2600 may physically include a group of two or more units. Furthermore, a part of functions to be carried out by the control units 2100 to 2600 may be implemented by other control units. In short, as long as the above calculation processing implemented by transmission and reception of information via the communication network 2010 is configured to be performed by one of the control units, it is allowed to modify the configuration of the vehicle control system 2000. Furthermore, a sensor or devices connected to any one of the control units may be connected to another control unit, and information detected or acquired by a certain sensor or a device may be mutually transmitted and received via the communication network 2010 among a plurality of control units.

The microcomputer 2610 of the integrated control unit 2600 can implement automatic driving control of the vehicle according to a predetermined program. For example in a case where automatic driving is performed by limiting to expressways, it is necessary to switch from the automatic driving mode to the manual driving mode near an exit of the expressway.

In order to safely switch the vehicle from the automatic driving mode to the manual driving mode, efforts have been made such as to switch to manual driving with a margin in time or to reduce the load of driving operation by interposing the transition mode (see Patent Document 1 for example).

There are cases where a driver falls asleep or loses consciousness while the automatic driving is performed and thus it is difficult or impossible to immediately switch to manual driving. Therefore, in order to switch from automatic driving to manual driving with ensured safety, it is preferable to notify of switching of the driving modes with sufficient time margin. On the other hand, a driver may feel annoyed if the driver is notified of switching of the driving modes at a quite early stage even though the driver is ready to promptly shift to manual driving.

Various cases are assumed as to what condition a driver or a fellow passenger is in when the vehicle is intended to be switched from the automatic driving mode to the manual driving mode. The applicant considers that it is necessary to grasp the condition of a driver in order to switch from automatic driving to manual driving with ensured safety while convenience for the driver is taken into consideration. That is, it is preferable to allow a notification timing to be variable depending on the condition of a driver but to notify of switching of driving modes at the same timing all the time. Moreover, rather than notifying switching of driving modes by the same method all the time, selecting a notification method appropriate for the condition of a driver enables switching from automatic driving to manual driving with ensured safety and contributes to the convenience of the driver.

Therefore, proposed herein is a drive assistance technology for notifying of switching to manual driving at an optimum timing by an optimum method depending on the condition of a driver (furthermore, the condition of a fellow passenger) upon switching from automatic driving to manual driving, while will be explained in detail below. According to the technology disclosed herein, monitoring the condition of a driver or a fellow passenger enables implementing safer switching of the driving modes.

An outline of a method of controlling the notification timing of switching driving modes according to the technology disclosed herein will be explained with reference to FIG. 3. In this figure, it is assumed that automatic driving is limited to expressways and automatic driving is switched to manual driving near an exit of an expressway. In addition, in the vehicle control system 2000, the driver condition detector 2510 constantly monitors the condition of a driver and also a fellow passenger, and the microcomputer 2610 of the integrated control unit 2600 optimizes the timing and the notification method for notifying of switching from automatic driving to manual driving on the basis of the condition of the driver or the fellow passenger obtained from the in-vehicle information detecting device 2500 on the basis of a predetermined program.

Figure 3:
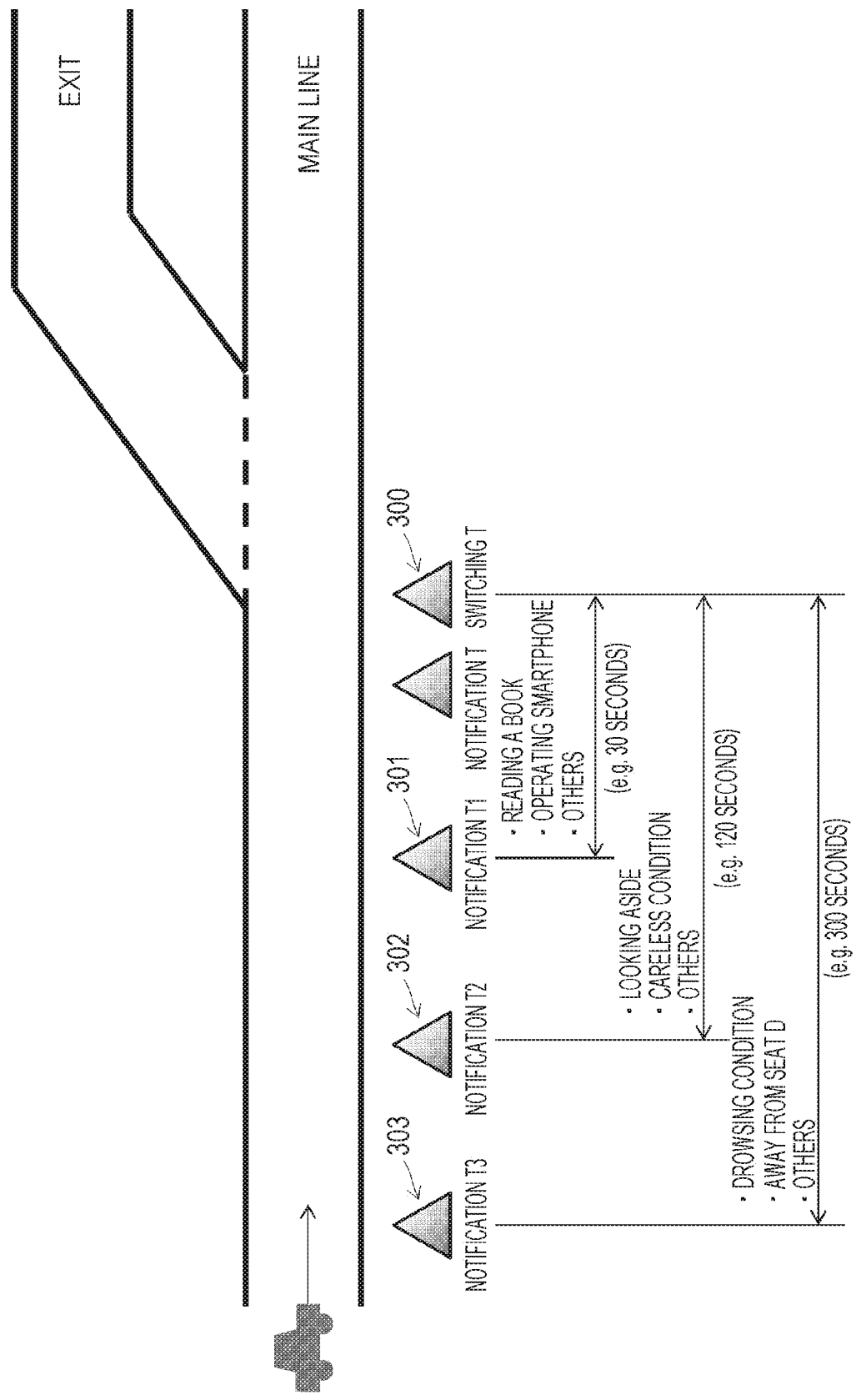
FIG. 3 is a diagram illustrating an outline of a method of controlling the notification timing of switching driving modes according to the technology disclosed herein.

In FIG. 3, a point indicated by symbol 300 is a branch point between the expressway (main line) and the exit to a general road and corresponds to a switching timing (hereinafter referred to as "switching T") at which a vehicle traveling in the automatic driving mode is switched to the manual driving mode. In addition, a timing at which normal notification is performed immediately before switching to the manual driving mode near the exit is referred to as "notification T".

As described above, in order to switch from the automatic driving mode to the manual driving mode with ensured safety, it is preferable to notify of switching of the driving modes with sufficient time margin. In the present embodiment, a plurality of notification timings to notify of switching from the automatic driving mode to the manual driving mode at an early stage is set assuming various conditions of a driver (also a fellow passenger). In the example illustrated in FIG. 3, three types of early notification timings (hereinafter referred to as "notification T1", "notification T2", and "notification T3") different in premature time to the switching T are set. Moreover, for convenience, notification T1, notification T2, and notification T3 are illustrated at points 301, 302, and 303, respectively, which are separated from the switching T by a traveling distance corresponding to premature time of each of the notification timings before a point 300 which corresponds to the switching T. Here, each of T1 to T3 is set as a time period during which the driver can sufficiently prepare for switching from the automatic driving mode to the manual driving mode depending on the condition of the driver (details will be described later). For example, T1=30 seconds, T2=120 seconds, T3=300 seconds, and the like are set. In this case, in a case where the traveling speed of the vehicle is high, the distance from the point 300 to the respective points 301, 302, and 303 become longer than those with a slower traveling speed.

Notifying a driver who is drowsing or a driver who is away from the driver's seat (seat D) of switching to the manual driving mode at the notification T3 which is an earlier timing (long premature time) allows the driver to have sufficient time margin to be ready for manual driving and to shift to driving action more safely.

Moreover, a driver who is reading a book or operating a smartphone is expected to be able to shift to driving action immediately after a notification. Therefore, for such a driver it is sufficient to notify of switching to the manual driving mode at the notification T1 which is closer to the switching T (or a normal notification timing (notification T)) (that is, premature time is short), which also leads to reduction in troublesomeness for the driver. The driver can enjoy reading the book or continue operating the smartphone until time when the vehicle approaches immediately before the switching T.

Meanwhile, a driver who is looking aside or in a careless condition is expected to be able to be ready for manual driving in shorter time than a driver in a drowsing condition or a driver who is away from the driver's seat although it is difficult to shift to driving action immediately after a notification. Therefore, for a driver who is looking aside or in a careless condition, switching to the manual driving mode is notified by notification T2 which is a timing having an intermediate premature time between notification T1 and notification T3.

In this manner, notifying of switching from the automatic driving mode to the manual driving mode at a notification timing depending on the condition of the driver enables a safer notification suited for the driver's preference.

A definition of each of the notification timings T1, T2, and T3 will be described below.

(1) Notification T1

A driver who is reading a book or operating a smartphone is clearly conscious and is expected to be able to shift to manual driving immediately after a notification once the driver stops reading the book or operating the smartphone. Therefore, reaction time from time of reception of a notification by a person to time of taking a reaction is regarded as premature time at the notification T1.

(2) Notification T2

The careless condition refers to a condition in which attention to driving is distracted due to fatigue, lack of sleep or the like. The condition of looking aside is also similar in that attention is distracted. A driver in such a condition has to understanding the situation of the driver's vehicle in order to be ready for manual driving after a notification. Therefore, sufficient time for a person to understand the surrounding traffic environment is regarded as premature time at the notification T2.

(3) Notification T3

In a case where a driver is drowsing, it is considered that time for awakening a person is required in addition to the premature time defined in the notification T2. Moreover, in a case where a driver is away from the driver's seat, it is considered that time for the driver or another fellow passenger to be seated in the driver's seat is required in addition to the premature time defined in the notification T2. Therefore, time for completely awakening a person from a sleeping condition or time for a person to be seated in the driver's seat and time for understanding the surrounding traffic environment is regarded as premature time at the notification T3.

Figure 4:
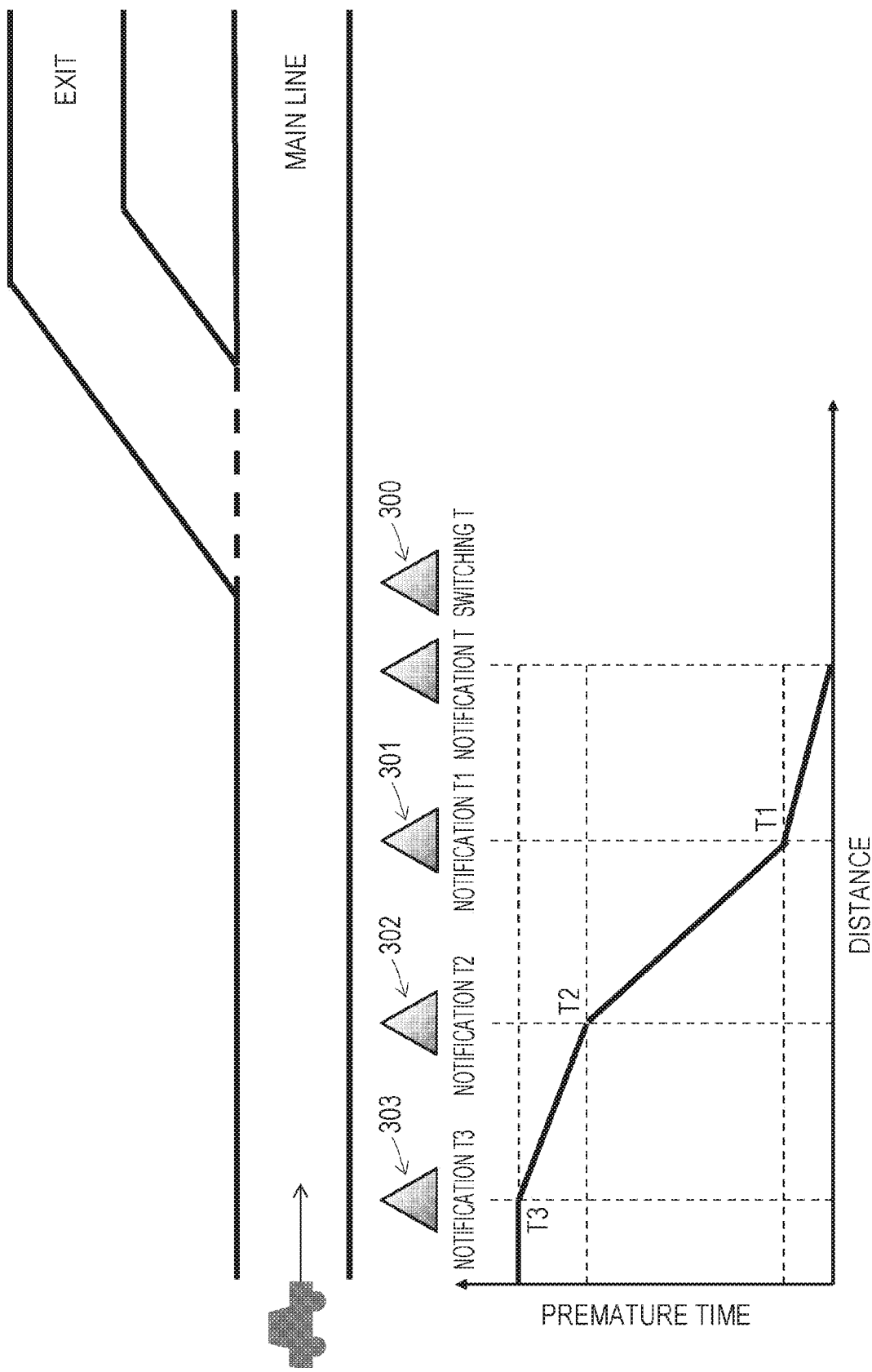
FIG. 4 is a diagram exemplifying the relationship between the premature time at each notification timing and the distance to a point at which driving modes are switched.

An example of the relationship between premature time at each of the notification timings and the distance to the point at which driving modes are switched is illustrated in FIG. 4. As can be seen from the figure, setting long premature time correspondingly results in a long distance to the point (the exit of the expressway) at which the driving modes are switched, thereby ensuring safety. Moreover, a driver who is ready to shift to manual driving feels annoyed about waiting time or the distance before actually switching to the manual driving mode after reacting to the notification of the mode switching, and thus it is only required to set short premature time.

Note that in the examples illustrated in FIGS. 3 and 4, three types of notification timings are set; however, two or four or more notification timings may be set, and a notification timing according to the condition of a driver may be selectively used. Incidentally, a notification timing can be set by time from a notification to switching to the manual driving mode or a distance to the switching point; however, the length of the premature time or the distance of each notification timing may be fixed or variable. For example, a driver may be allowed to adjust the time length or the distance of a notification timing when a notification is made. It should be well understood that, basically in the technology disclosed herein, notification is made at a timing close to a timing of switching to manual driving in a case where a driver is ready to immediately shift to manual driving, but notification is made sufficiently early in a case where the driver cannot immediately shift to manual driving.

Moreover, in the example illustrated in FIG. 3, the branch point 300 between the expressway (main line) and the exit to the general road corresponds to a switching timing (hereinafter referred to as "switching T") at which the vehicle traveling in the automatic driving mode is switched to the manual driving mode. In reality, the switching timing varies depending on a limit range of the sensor performance for detecting an exit of an expressway or a situation. Moreover, switching timings may be different for each operator of the system. The technology disclosed herein has a main feature in that timings of notifying of switching the driving modes are controlled but in to which point in time to set switching timings of the driving modes. Therefore, in the following description, a "switching timing" will be described as a desired point.

In order to implement control notification timings of driving mode switching, it is necessary to recognize the condition of a driver more accurately. The vehicle control system 2000 according to the present embodiment is configured to detect the condition of a driver on the basis of the detection result of the driver condition detector 2510. The condition of the driver referred to here is roughly classified into two of "possible" and "impossible" with regard to driving by the driver. The condition of a driver and means used for detecting the condition of the driver are summarized in Table 1 below.

TABLE 1

| | | Detection means | | | | |
|---|---|---|---|---|---|---|
| Condition of driving | Condition of driver | Driving monitor camera | Load sensor | Biosensor | Driving operation device | Condition check |
| Possible | Normally confirming surroundings | | | | | ○ |
| | Reading, TV, movie | ○ | | | | |
| | Operating smartphone | ○ | | | | |
| | Talking on phone | ○ | | | | |
| | Drowsing | ○ | | | | |
| | Looking aside | ○ | | | | |
| | Away from seat D | | ○ | | | |
| Impossible | Drinking alcohol | | | ○ | | |
| | Unconscious | | | ○ | | |
| | Sick | | | ○ | | |
| | Under stress, anger (mental | | | ○ | | |

TABLE 1-continued

| | | Detection means | | | | |
|---|---|---|---|---|---|---|
| Condition of driving | Condition of driver | Driving monitor camera | Load sensor | Biosensor | Driving operation device | Condition check |
| | condition) Not carrying driver's license | | | | | ○ |
| | Refusing to drive | | | | | ○ |

Note that in the above Table 1, the "driving operation device" which is one of the detection means refers to any device with which a driver operates the vehicle. For example, the driving operation device includes an accelerator, a brake, a steering wheel, a wiper, an indicator, an air conditioner, and other switches.

Note that the classification between whether driving is possible or impossible and the condition of the driver illustrated in Table 1 is merely an example, and classification is not necessarily limited thereto in an actual operation. Moreover, the condition of the driver listed in Table 1 is an example, and other conditions of the driver may be also included. In addition, in order to more accurately detect each of the condition of the driver, a plurality of detection means may be combined.

In addition, a subject the condition of whom is to be detected may not be limited to the driver seated at the driver's seat, and the condition of all the passengers may be confirmed. This is because it is assumed that, even in the case where the driver is away from the driver's seat during the automatic driving of the vehicle or driving by the driver is impossible, driving becomes possible with fellow passengers replaced (that is, switching to the manual driving mode becomes possible).

Moreover, the condition check takes into consideration that there is a possibility that a driver is not limited to one person on the way but may change each time. For this reason, it is necessary to have a means for checking whether driving of the vehicle itself is possible such as whether a driver's license is held not only whether driving operation can be performed.

Next, a notification method for a driver will be described.

An object of notifying is to "let a driver aware of switching from automatic driving to manual driving". Therefore, it is necessary to use an optimal notification method to achieve this object. As a way of determining a notification method, considered are the condition of a driver and time margin (time from the notification timing to the switching timing) before switching to the manual driving mode or the distance (distance from a point where a notification is made to a point where switching to the manual driving mode is performed (exit of an expressway)).

The notification method referred to here specifically means to select a device used for notification. Devices used for notification may include those other than on-board devices such as a smartphone or a tablet carried by a drivers or a fellow passenger. In a case where the margin time or the distance before switching to the manual driving mode is small, in other words, depending on the degree of urgency, two or more notification methods may be combined.

The condition of a driver and notification methods for each of the conditions of the driver are summarized in Table 2 below. Furthermore, notification methods depending on the margin time or the distance before switching to the manual driving mode are summarized in Table 3 below.

TABLE 2

| | Notification method | | | |
|---|---|---|---|---|
| Condition of driver | Buzzer | Display | Haptic | Mobile |
| Normally confirming surroundings | | ○ | | ○ |
| Reading, TV, movie | ○ | | | ○ |
| Operating smartphone | ○ | | | ○ |
| Talking on phone | | ○ | | ○ |
| Drowsing | ○ | | ○ | ○ |
| Looking aside | ○ | | ○ | ○ |
| Drinking alcohol | ○ | ○ | ○ | ○ |
| Unconscious | ○ | ○ | ○ | ○ |
| Sick | ○ | ○ | ○ | ○ |
| Away from seat D | ○ | | | ○ |
| Not carrying driver's license | ○ | ○ | | ○ |
| Refusing to drive | ○ | ○ | | ○ |

TABLE 3

| Margin time or distance to switching | Notification method |
|---|---|
| Sufficient | Any one or a combination of Buzzer, Display, Haptic, and Mobile |
| Urgent | All the notification methods |

In Table 2, the notification method by Buzzer is a method of notifying of switching to the manual driving mode by issuing a warning sound from, for example, a meter buzzer or a speaker near the driver's seat (e.g. audio speaker 2710 in FIG. 1). Normally a notification is made to a driver seated at the driver's seat; however, the driver is not necessarily seated in the driver's seat during automatic driving. It is desirable to notify all the passengers by issuing a warning sound from all the speakers in the vehicle also assuming that the driver is away from the driver's seat.

Moreover, in the case of using the notification method by Display, it is preferable to display a notification not only at a single predetermined place but also at various places in the vehicle assuming that the driver is away from the driver's seat. For example, not only a meter panel disposed on the instrument panel 2730 ahead of the steering wheel but also devices having a display function such as a navigation system disposed in the center of the instrument panel 2730 in the vehicle width direction, an onboard display, or a head-up display (corresponds to the display unit 2720 in FIG. 1) can be used for the notification method by Display.

Haptic is a notification method using a haptic device that presents a kinesthetic sense or a tactile sense. A haptic device used for notification of switching to the manual driving mode may adopt any configuration. For example, a haptic device that gives force, vibration, movement, or the like to a seat may be used. Even in a case where the notification method by Haptic is used, it is desirable to present a kinesthetic sense or a tactile sense not only to the driver but also to all the fellow passengers assuming that the driver is away from the driver's seat. For example, force, vibration, movement, or the like is given not only to the driver's seat but to all the seats.

In the notification method by Mobile, by using a mobile device (corresponds to the in-vehicle device 2760 in FIG. 1) such as a smartphone or a tablet carried by passengers (including a driver and fellow passengers), switching to the manual driving mode is notified by sound output of warning sound or other sounds, image display, vibration function, or the like.

In a case where the driver is unable to visually confirm, such as when reading a book, watching TV or a movie, or drowsing, it is only required to adopt the notification method by Buzzer. Moreover, since the driver can visually confirm when the driver is normally confirming the surroundings or talking on the phone, it is only required to adopt the notification method by Display. Alternatively, in a case where there is a possibility that the driver does not notice a notification by Buzzer or Display when the driver is in a careless condition such as drowsing or looking aside, for example, it is only required to adopt the notification method by Haptic. Meanwhile, it appears that the notification method by Mobile is effective in any type of condition of the driver.

In a case where there is sufficient margin in time or distance before the switching timing to the manual driving mode, it is only required to notify of switching to the manual driving mode by using any one of or combining two or more of the notification methods by Buzzer, Display, Haptic, and Mobile described above. A point should also be considered that combining a number of notification methods makes the notification annoying for the driver and the fellow passengers.

Contrarily, in a case where there is no margin in time or distance to the switching timing to the manual driving mode and it is urgent, it is necessary to ensure that switching to the manual driving mode is surely notified to the driver and the fellow passengers by combining all the notification methods of Buzzer, Display, Haptic, and Mobile or as many notification methods as possible.

When a predetermined switching timing arrives after having notified the driver of switching to the manual driving mode, authority of driving is actually handed over to the driver. Several points to be noted upon performing notification of switching from the automatic driving mode to the manual driving mode at a notification timing by a notification method according to the condition of the driver will be described.

(1) Notification Subject

An object of notifying is basically to "let the driver aware of switching from automatic driving to manual driving" (described above). However, a case is also assumed where the driver is away from the driver's seat, drinking alcohol, being unconscious, experiencing sudden sickness, or refusing to drive for some reason during automatic driving. That is, since there is a possibility that the driver may be change each time the mode is switched to the manual driving mode, it is desirable that subjects of a notification include not only the driver who has been driving immediately before but all the passengers in the same vehicle.

(2) Confirmation of Driver's Reaction

Whether there is a reaction from the driver is confirmed when notification of switching to the manual driving mode is made at a notification timing by a notification method according to the condition of the driver. For example, by receiving a reaction from the driver such as that the driver has certainly woken up from drowsing, the driver has returned to the condition in which the driver can drive, or the driver has been changed to allow for driving, it is possible to shift to manual driving more safely. Means for confirming whether there is a reaction include confirmation by sound (utterance of the driver) and confirmation by pressing a button (specific button on the instrument panel). Furthermore, various confirmation means such as driver's driving ability diagnosis under virtual environment are conceivable. The detection means (see Table 1) for detecting the condition of a driver may be diverted to confirm whether there is a reaction from the driver.

(3) About Behavior after Notification

By receiving a reaction to a notification from the driver, it is possible to shift to manual driving more safely. On the other hand, in a case where there is no reaction from the driver, it is assumed that the driver cannot return to the condition in which the driver can drive until or that the driver is changed to another fellow passenger to allow for driving by a switching timing. Switching to the manual driving mode without a reaction from the driver is extremely dangerous and may cause a serious accident. It is also necessary to fully consider a behavior corresponding to the reaction from the driver.

In the case where the reaction from the driver is ensured, all the driving operations are immediately handed over to the driver upon the arrival of a predetermined switching timing. Contrarily, in the case where the reaction from the driver is unsure, driving operations are handed over to the driver in a stepwise manner upon the arrival of the predetermined switching timing. Alternatively, in a case where no reaction has been obtained from the driver, switching to the manual driving mode is canceled.

In the case of cancelling the switching, for example, an operation for ensuring safety is performed such as continuing automatic driving of the vehicle or finding a safe space before the point where switching to the manual driving mode is performed and to stop thereat. It is further desirable to strive for accident prevention by issuing a warning to surrounding vehicles or communicating the condition of the driver or a situation of an accident or the like that has happened to the driver to a management center on a cloud in addition to the operation for ensuring safety of the vehicle itself.

(4) Confirmation of Driver's Final Intention with Respect to Switching Timing

Figure 5:
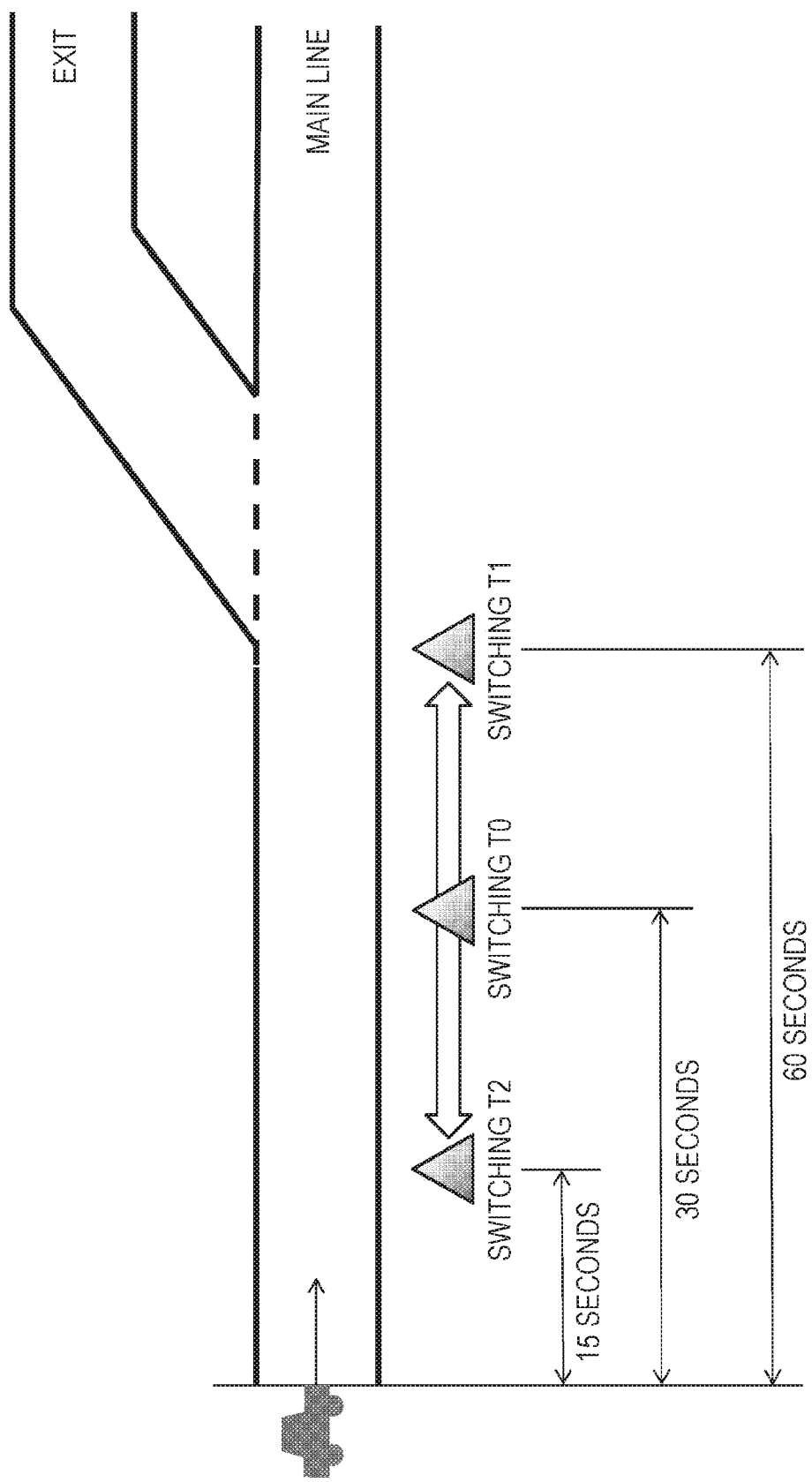
FIG. 5 is a diagram for explaining a method of adjusting the switching timing from an automatic driving mode to a manual driving mode.

Whether the driver having received the notification of switching to the manual driving mode wishes to change the switching timing to the manual driving mode is confirmed. In the example illustrated in FIG. 5, it is assumed that a switching timing (switching T0) is set at a point before an exit from an expressway (main line). The driver can change to a switching timing closer to the exit (switching T1) than the current switching timing or, conversely, change to a switching timing (switching T2) farther away. FIG. 5 is a display example displayed on the display unit 2720 in the vehicle or the in-vehicle device 2760 such as a smartphone owned by a passenger such as the driver via the in-vehicle device IF 2660. T0 denotes the preset switching timing, which shows that time from the current position to T0 totals 30 seconds. Furthermore, T1 and T2 indicate upper and lower limit ranges of the switching timing that can be changed from T0. T1 and T2 are determined depending on the current traveling speed, the condition of a road on which the vehicle is travelling, or traffic conditions (degree of congestion) with the safety taken in consideration. The example illustrated in FIG. 5 illustrates that, in a case where the user changes the switching timing from T0 to T2, time from the current time to the switching timing totals 15 seconds, and in a case of changing from T0 to T1, time from the current time to the switching timing totals 60 seconds. Passengers such as a driver can set any point as T0 within a range of 15 seconds to 60 seconds by operating a triangle icon corresponding to T0 displayed on a screen to slide on the screen, for example.

For example, in a case where the driver wishes to further extend time of automatic driving due to that the driver is talking on the phone, reading a book, watching a movie or the like, it is only required to change to a switching timing closer to the exit (switch T1). Alternatively, in a case where the driver wishes to switch to manual driving before the current switching timing, it is only required to change to a switching timing (switching T2) farther away. However, switching to the manual driving mode due to the driver's override is always permitted apart from this determination of the final intention.

Moreover, whether the driver having received the notification timing of switching to the manual driving mode wishes to change subsequent switching timings may also be confirmed. For example, in a case where the driver wishes to delay the notification timing (notification T1) in the driver condition such as talking on the phone, reading a book, watching a movie or the like, it is only required to shorten the premature time and to change the notification T1 to a point closer to the switching timing. Moreover, in a case where the driver tends to be absorbed in talking on the phone or reading a book and thus the driver wishes to accelerate the notification timing (notification T1) in these driver conditions, it is only required to extent the premature time and to extend the distance to the notification T1 from the switching timing.

Figure 6:
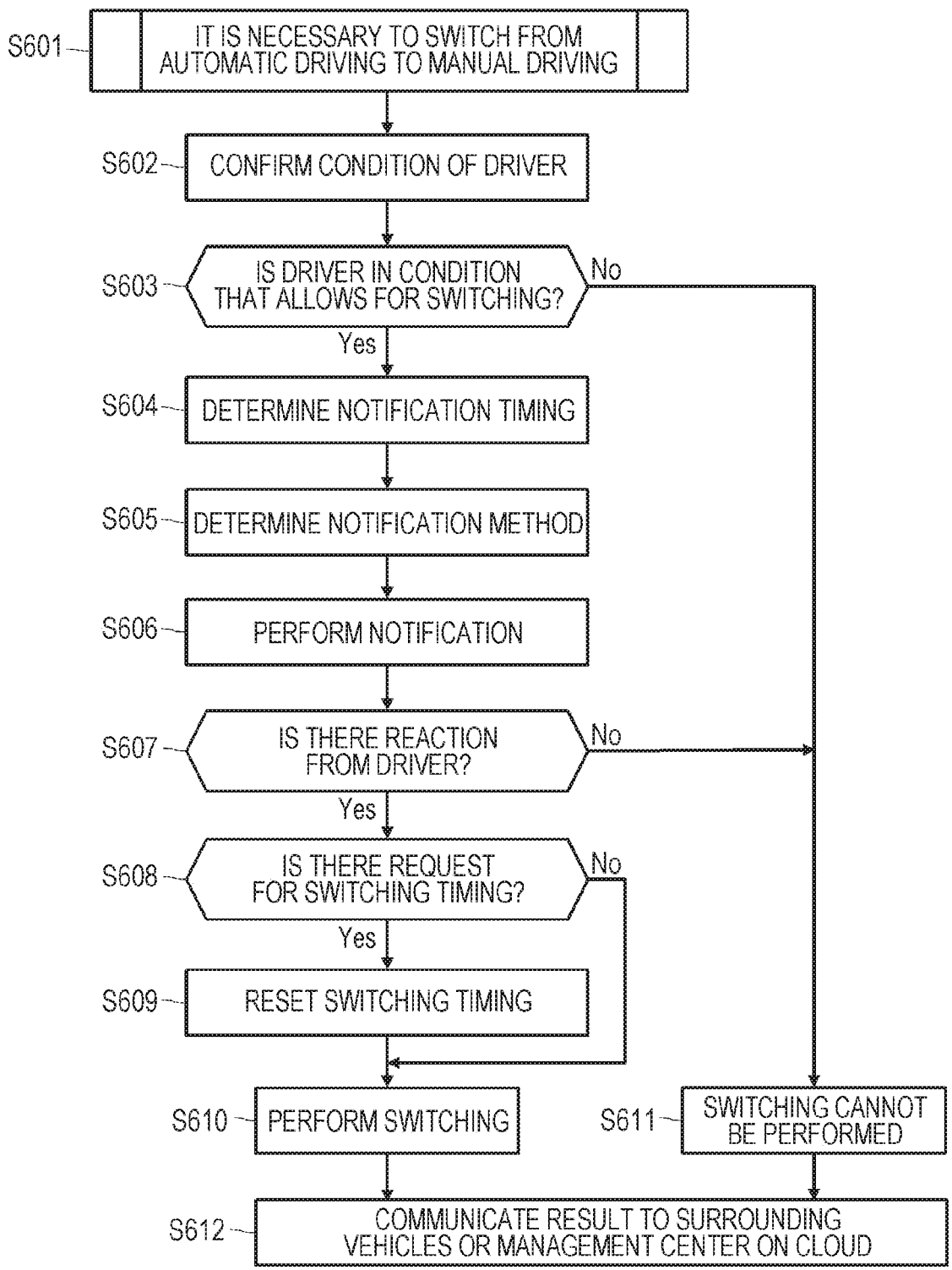
FIG. 6 is a flowchart illustrating a processing procedure for implementing switching a vehicle from automatic driving to manual driving in the vehicle control system 2000.

In FIG. 6, a processing procedure for implementing switching a vehicle from automatic driving to manual driving in the vehicle control system 2000 according to the present embodiment is illustrated in the form of a flowchart. The illustrated processing procedure is performed, for example, mainly by the microcomputer 2610 in the integrated control unit 2600.

First, the microcomputer 2610 detects that it is necessary to switch the vehicle under automatic driving to the manual driving mode (step S601).

For example, it is necessary to switch the vehicle from the automatic driving mode to the manual driving mode at a branch point between an expressway (main line) and an exit to a general road. For example, it can be detected that it is necessary to switch the vehicle to the manual driving mode on the basis of detection of the exit of the expressway or monitoring data by a navigation system or the like, but by the other method; however, the processing of step S601 may be implemented by other methods.

Next, the in-vehicle information detecting unit 2500 confirms the condition of the driver on the basis of a detection result by the driver condition detector 2510 and notifies the microcomputer 2610 of the result (step S602).

The driver condition detector 2510 is capable of detecting various driver conditions on the basis of, for example, output signals from a driving monitor camera, a load sensor, a biosensor, or a driving operation device or condition check (see Table 1 for example). The driver condition can be roughly classified into a condition in which driving can be performed and a condition in which driving cannot be performed.

On the basis of the condition of the driver detected in step S602, the microcomputer 2610 then checks whether the driver can perform driving and whether being in a condition in which switching to the manual driving mode is possible (step S603).

If it is determined that the driver cannot shift to the manual driving mode (No in step S603), the microcomputer 2610 disables switching of the vehicle to the manual driving mode (step S611).

In the case where switching to the manual driving mode is disabled, for example, an operation for ensuring safety is performed such as continuing automatic driving of the vehicle or finding a safe space before the point where switching to the manual driving mode is performed and to stop thereat. Moreover, in addition to the operation for ensuring safety of the vehicle itself, a warning is issued to surrounding vehicles, or the condition of the driver or a situation of an accident or the like that has happened to the driver is communicated to a management center on a cloud (step S612). This allows the surrounding vehicles to detect that an abnormality has occurred in the vehicle and to strive to avoid an accident.

On the other hand, if it is determined that the driver can shift to the manual driving mode (Yes in step S603), the microcomputer 2610 determines a notification timing suitable for the condition of the driver having confirmed in step S602 (step S604).

The notification timings depending on the condition of the driver are as have already explained with reference to FIG. 3. For example, a driver who is reading a book or operating a smartphone is clearly conscious and is expected to be able to shift to manual driving immediately after a notification once the driver stops reading the book or operating the smartphone and thus the notification T1 having short premature time is determined. Meanwhile for a driver in a careless condition, the notification T2, having a sufficient premature time for understanding the situation of the driver's vehicle in order for the driver to be ready for manual driving after the notification, is determined. Moreover, in a case where a driver is drowsing or away from the driver's seat, the notification T3 having premature time required for a person to be awake or to be seated in the driver's seat is determined.

Next, the microcomputer 2610 determines a notification method suitable for the condition of the driver having confirmed in step S602 (step S605).

For example, switching to the manual driving mode can be notified by using a notification method such as Buzzer, Display, Haptic, or Mobile. Furthermore, when a notification method is determined in step S605, a plurality of notification methods may be combined in consideration of a margin of time or the distance to the switching timing to the manual driving mode. In a case where there is no margin in time or distance to the switching timing to the manual driving mode and it is urgent, it is necessary to ensure that switching to the manual driving mode is surely notified to the driver and the fellow passengers by combining all the notification methods of Buzzer, Display, Haptic, and Mobile or as many notification methods as possible.

In addition, when the notification timing determined in step S604 arrives, the microcomputer 2610 outputs a control signal to the in-vehicle device 2760, the audio speaker 2710, the display unit 2720, the instrument panel 2730, and other devices and performs notification by the notification method having determined in step S605 (step S606).

After performing the notification in step S606, the microcomputer 2610 checks whether there is a reaction from the driver for this notification (step S607). Means for confirming whether there is a reaction include confirmation by sound (utterance of the driver) and confirmation by pressing a button (specific button on the instrument panel). Furthermore, various confirmation means such as driver's driving ability diagnosis under virtual environment are conceivable.

In a case where there is no reaction from the driver, it is assumed that the driver cannot return to the condition in which the driver can drive until or that the driver is changed to another fellow passenger to allow for driving by a switching timing. Switching to the manual driving mode without a reaction from the driver is extremely dangerous and may cause a serious accident. Therefore, if no reaction has been obtained from the driver (No in step S607), the switching to the manual driving mode is disabled (step S611), and the switching to the manual driving mode is halted. In this case, for example, an operation for ensuring safety is performed such as continuing automatic driving of the vehicle or finding a safe space before the point where switching to the manual driving mode is performed and to stop thereat. In addition, accident prevention is further striven for by issuing a warning to surrounding vehicles or communicating the condition of the driver or a situation of an accident or the like that has happened to the driver to a management center on a cloud in addition to the operation for ensuring safety of the vehicle itself (step S612).

If a reaction to the notification from the driver can be confirmed (Yes in step S607), it is possible to shift to manual driving more safely.

Next, the microcomputer 2610 checks whether there is a request for a switching timing for switching to the manual driving mode from the driver notified of the switching to the manual driving mode (step S608).

In this step S608, the display screen illustrated in FIG. 5 is displayed on the display unit 2720 or the driver's smartphone or other devices as and the in-vehicle device 2760 on the basis of control by the integrated control unit 2600. For example, by operating the display screen of FIG. 5 displayed on the smartphone held by the driver (as the in-vehicle device 2760), the driver can change to a switching timing closer to the exit than the current switching timing or, contrarily, change to a switching timing farther away (see FIG. 5). If there is a request for a switching timing from the driver (Yes in step S608), the microcomputer 2610 resets to a switching timing requested by the driver (step S609). When the microcomputer 2610 resets the switching timing on the basis of information related to the switching timing instructed by the smartphone of the passenger (as the in-vehicle device 2760), the passenger as a driver can change the switching timing without moving to the place where the display unit 2720 is.

When the switching timing preset or reset in step S609 arrives, the microcomputer 2610 outputs a control command to the drive system control unit 2100 and performs switching the vehicle from the automatic driving mode to the manual driving mode (step S610).

The microcomputer 2610 further notifies surrounding vehicles or a management center on a cloud that the vehicle has been successfully switched from the automatic driving mode to the manual driving mode (step S612). When detecting that the vehicle has been switched to the manual driving mode, the surrounding vehicles can consider changing its own driving mode or other means.

Figure 7:
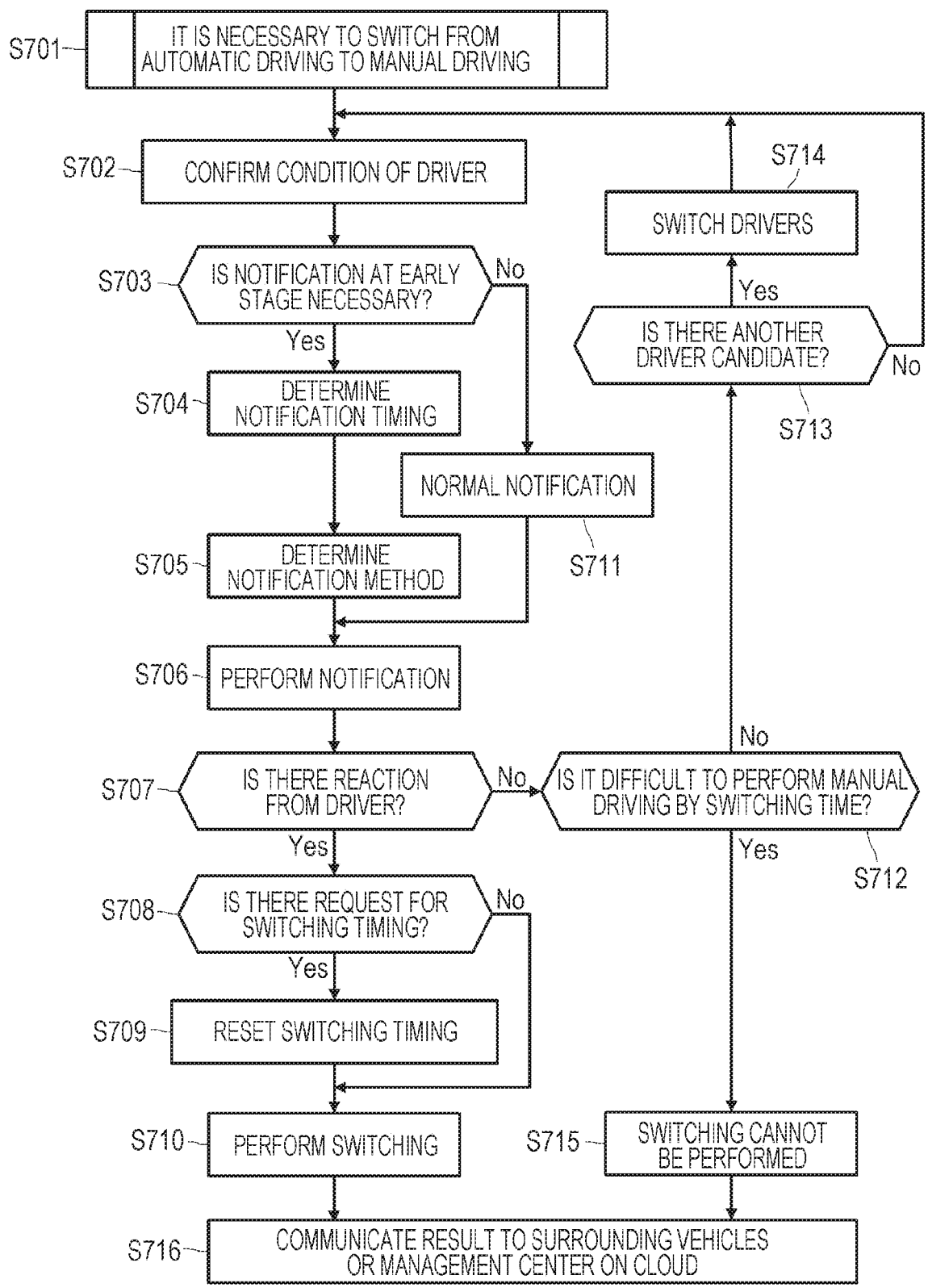
FIG. 7 is a flowchart illustrating another processing procedure for implementing switching a vehicle from automatic driving to manual driving in the vehicle control system 2000.

In FIG. 7, another processing procedure for implementing switching a vehicle from automatic driving to manual driving in the vehicle control system 2000 according to the present embodiment is illustrated in the form of a flowchart. In the processing procedure illustrated in FIG. 7, it is assumed that a normal notification timing (notification T) for notifying of switching from the automatic driving mode to the manual driving mode and notification timings (notifications T1 to T3) earlier than the notification T are prepared. Note that the processing procedure illustrated in FIG. 7 is also performed, for example, mainly by the microcomputer 2610 in the integrated control unit 2600.

First, the microcomputer 2610 detects that it is necessary to switch the vehicle under automatic driving to the manual driving mode (step S701). For example, a branch point between an expressway (main line) and an exit to a general road approaches on the basis of exit detection on an expressway or monitoring data by a navigation system or the like, and it is detected that it is necessary to switch the vehicle to the manual driving mode (same as the above).

Next, the in-vehicle information detecting unit 2500 confirms the condition of the driver on the basis of a detection result by the driver condition detector 2510 and notifies the microcomputer 2610 of the result (step S702). The driver condition detector 2510 is capable of detecting various driver conditions on the basis of, for example, output signals from a driving monitor camera, a load sensor, a biosensor, or a driving operation device or condition check (same as the above).

Next, the microcomputer 2610 checks whether it is necessary to notify of the switching to the manual driving mode at an early stage on the basis of the condition of the driver having detected in step S702 (step S703).

For example, if it is determined that the driver is seated at the driver's seat and is able to normally confirm the surroundings and that it is not necessary to notify of the switching to the manual driving mode at an early stage (No in step S703), the microcomputer 2610 sets a normal notification timing (notification T) and a normal notification method (e.g. notification by only one of Buzzer and Display) (step S711).

On the other hand, if it is determined it is necessary to notify of the switching to the manual driving mode at an early stage (Yes in step S703), the microcomputer 2610 determines an early notification timing suitable for the condition of the driver having confirmed in step S702 (step S704). For example, a driver who is reading a book or operating a smartphone is clearly conscious and is expected to be able to shift to manual driving immediately after a notification once the driver stops reading the book or operating the smartphone and thus the notification T1 having short premature time is determined. Meanwhile for a driver in a careless condition, the notification T2, having a sufficient premature time for understanding the situation of the driver's vehicle in order for the driver to be ready for manual driving after the notification, is determined. Moreover, in a case where a driver is drowsing or away from the driver's seat, the notification T3 having premature time required for a person to be awake or to be seated in the driver's seat is determined.

Next, the microcomputer 2610 determines a notification method suitable for the condition of the driver having confirmed in step S702 (step S705). For example, switching to the manual driving mode can be notified by using a notification method such as Buzzer, Display, Haptic, or Mobile. Furthermore, when a notification method is determined in step S705, a plurality of notification methods may be combined in consideration of a margin of time or the distance to the switching timing to the manual driving mode (same as the above).

In addition, when the notification timing determined in step S704 arrives, the microcomputer 2610 outputs a control signal to the in-vehicle device 2760, the audio speaker 2710, the display unit 2720, the instrument panel 2730, and other devices and performs a notification at an early stage or a normal notification by the notification method having determined in step S705 (step S706).

After performing the notification in step S706, the microcomputer 2610 checks whether there is a reaction from the driver for this notification (step S707). Means for confirming whether there is a reaction include confirmation by sound (utterance of the driver) and confirmation by pressing a button (specific button on the instrument panel). Furthermore, various confirmation means such as driver's driving ability diagnosis under virtual environment are conceivable.

If no reaction is obtained from the driver (No in step S707), the microcomputer 2610 further checks whether there is no time margin to switch to the switching timing to the manual driving mode and whether manual driving by the driver is difficult (step S712).

If there is no time margin to the switching timing to the manual driving mode and manual operation by the driver is difficult (Yes in step S712), switching to the manual driving mode is disabled (step S715), and switching to the manual driving mode is halted. In this case, for example, an operation for ensuring safety is performed such as continuing automatic driving of the vehicle or finding a safe space before the point where switching to the manual driving mode is performed and to stop thereat. In addition, accident prevention is further striven for by issuing a warning to surrounding vehicles or communicating the condition of the driver or a situation of an accident or the like that has happened to the driver to a management center on a cloud in addition to the operation for ensuring safety of the vehicle itself (step S716).

In addition, if there is no reaction from the driver (No in step S707) but there is still time margin to the switching timing to the manual driving mode (No in step S712), it is further checked whether there is another passenger in the vehicle, that is, whether there is another candidate driver (step S713).

If there is no other candidate driver (No in step S713), the flow returns to step S702 to confirm the condition of the same driver for the second time (step S702), and determination of a notification timing and a notification method and performing the notification are repeated (steps S704 to S706). In addition, if there is another candidate driver (Yes in step S713), the driver is replaced with the candidate driver (step S714). Then the condition of the new driver is confirmed again (step S702), and a notification timing and a notification method according to the condition are determined, and the notification is performed (steps S704 to S706).

If a reaction to the notification from any driver onboard the vehicle can be confirmed (Yes in step S707), it is possible to shift to manual driving more safely.

Next, the microcomputer 2610 checks whether there is a request for a switching timing for switching to the manual driving mode from the driver notified of the switching to the manual driving mode (step S708).

The driver can change to a switching timing closer to the exit than the current switching timing or, conversely, change to a switching timing farther away (see FIG. 5). If there is a request for a switching timing from the driver (Yes in step S708), the microcomputer 2610 resets to a switching timing requested by the driver (step S709).

When the switching timing preset or reset in step S609 arrives, the microcomputer 2610 outputs a control command to the drive system control unit 2100 and performs switching the vehicle from the automatic driving mode to the manual driving mode (step S710).

The microcomputer 2610 further notifies surrounding vehicles or a management center on a cloud that the vehicle has been successfully switched from the automatic driving mode to the manual driving mode (step S716). When detecting that the vehicle has been switched to the manual driving mode, the surrounding vehicles can consider changing its own driving mode or other means.

INDUSTRIAL APPLICABILITY

The technology disclosed herein has been described in detail with reference to specific embodiments. However, it is obvious that those skilled in the art can make modifications or substitutions of the embodiments without departing from the principals of the technology disclosed herein.

The technology disclosed herein can be applied to a variety of vehicles such as cars (including gasoline-powered vehicles and diesel-powered vehicles), electric cars, hybrid electric cars, motorcycles, bicycles, and personal mobilities as well as moving bodies of a form other than vehicles that travel on a road.

In short, the technology disclosed herein has been described by way of exemplification, and the contents of the description of this specification shall not be interpreted in a limiting sense. In order to judge the principals of the technology disclosed herein, the scope of claims should be taken into consideration.

Note that the technology disclosed herein may also employ configurations as follows.

(1) A drive assistance device, including:
a condition detector configured to detect condition of a driver; and
a control unit configured to control a timing to notify of switching of driving modes of a vehicle on the basis of a detection result by the condition detector.

(2) The drive assistance device according to (1),
in which the control unit controls a timing to notify of switching of the vehicle from an automatic driving mode to a manual driving mode.

(3) The drive assistance device according to (2),
in which the control unit sets premature time to perform the notification depending on whether the driver is ready to perform manual driving.

(4) The drive assistance device according to (3),
in which, in second condition in which the driver's attention is distracted, the control unit sets premature time longer than that in first condition in which the driver is conscious but is performing another work.

(5) The drive assistance device according to (4),
in which, in third condition in which the driver is drowsing or away from a driver's seat, the control unit sets premature time even longer than that in the second condition.

(6) The drive assistance device according to any one of (1) to (5),
in which the control unit further controls a method of notifying of switching of the driving modes of the vehicle on the basis of the detection result by the condition detector.

(7) The drive assistance device according to (6), in which the control unit controls the notification method further considering time or distance to switching the vehicle from an automatic driving mode to a manual driving mode.

(8) The drive assistance device according to (6), further including:

a notification unit configured to use a plurality of means of notifying of switching of the driving modes of the vehicle, in which the control unit performs the notification method in which more of the plurality of means are combined in a case where there is no margin in time or distance to switching the vehicle from the automatic driving mode to the manual driving mode.

(9) The drive assistance device according to (8), in which the notification unit can use at least two out of audio output, image display, presentation of a kinesthetic sense or a tactile sense, and an information terminal held by a passenger of the vehicle.

(10) The drive assistance device according to (1), in which the control unit causes the condition detector to detect condition of the driver after the notification is performed and further controls the switching of the driving modes of the vehicle on the basis of the detection result.

(11) The drive assistance device according to (10), in which, in a case where reaction of the driver to the notification of the switching the vehicle from an automatic driving mode to a manual driving mode cannot be confirmed, the control unit halts switching to the manual driving mode.

(12) The drive assistance device according to (1), in which the control unit sets a timing to switch the vehicle from an automatic driving mode to a manual driving mode in response to a request from the driver.

(13) The drive assistance device according to (1), in which the control unit communicates information regarding the performance of the switching the vehicle from an automatic driving mode to a manual driving mode to a surrounding vehicle or an external device.

(14) The drive assistance device according to (1), in which, in a case where reaction of a first passenger to the notification of the switching the vehicle from an automatic driving mode to a manual driving mode cannot be confirmed, the control unit sets a second passenger of the vehicle as a new driver and controls a timing to notify of switching of the driving modes on the basis of a detection result of the second passenger by the condition detector.

(15) A drive assistance method, including:

a condition detecting step of detecting condition of a driver; and a control step of controlling a timing to notify of switching of driving modes of a vehicle on the basis of a detection result in the condition detecting step.

(16) A moving body, including:

a driving unit configured to be driven to travel in one of a plurality of driving modes;

a condition detector configured to detect condition of a driver; and a control unit configured to control a timing to notify of switching of driving modes of the driving unit on the basis of a detection result by the condition detector.

REFERENCE SIGNS LIST

2000 Vehicle control system
2010 Communication network
2100 Drive system control unit
2110 Vehicle condition detector
2200 Body system control unit
2300 Battery control unit
2310 Battery device
2400 Exterior information detecting unit
2410 Imaging unit
2420 Exterior information detector
2500 In-vehicle information detecting device
2510 Driver condition detector
2600 Integrated control unit
2610 Microcomputer
2620 General purpose communication interface
2630 Dedicated communication interface
2640 Positioning unit
2650 Beacon reception unit
2660 In-vehicle device interface
2670 Audio image output unit
2680 On-board network interface
2690 Storage unit
2710 Audio speaker
2720 Display unit
2730 Instrument panel
2760 In-vehicle device
2800 Input unit
2900 Vehicle
2910, 2912, 2914, 2916, 2918 Imaging unit
2920, 2922, 2924 Exterior information detector
2926, 2928, 2930 Exterior information detector

The invention claimed is:

1. A drive assistance device, comprising:

a condition detector configured to detect a first condition of a driver in an automatic driving mode of a vehicle; and a microcomputer configured to:

control a first timing of a notification of switch of driving modes of the vehicle, wherein the control of the first timing is based on the detected first condition of the driver, and the driver corresponds to a first passenger of the vehicle;

notify the switch of the driving modes of the vehicle to the first passenger at the first timing; and set a second passenger of the vehicle as a new driver of the vehicle based on no reaction of the first passenger to the notification of the switch of the driving modes of the vehicle, wherein the condition detector is further configured to detect a condition of the new driver, and the microcomputer is further configured to control, based on the detected condition of the new driver, a second timing of the notification of the switch of the driving modes of the vehicle.

2. The drive assistance device according to claim 1, wherein the switch of the driving modes of the vehicle corresponds to switch of the vehicle from the automatic driving mode to a manual driving mode.

3. The drive assistance device according to claim 2, wherein the microcomputer is further configured to:

set a first value of a premature time based on driver's readiness to perform manual driving; and control the first timing of the notification based on the first value of the premature time.

4. The drive assistance device according to claim 3, wherein the microcomputer is further configured to:

set the first value of the premature time based on a first condition in which the driver is conscious but is performing a work; and set a second value of the premature time based on a second condition in which driver's attention is distracted, and the second value is larger than the first value.

5. The drive assistance device according to claim 4, wherein the microcomputer is further configured to set a third value of the premature time based on a third condition in which the driver is drowsing or away from driver's seat, and the third value is larger than the second value.

6. The drive assistance device according to claim 2, wherein the switch of the vehicle from the automatic driving mode to the manual driving mode is at a switching timing, the microcomputer is further configured to change the switching timing from a third timing to one of a fourth timing or a fifth timing, based on a request from the driver, and the fourth timing and the fifth timing are based on a current travelling speed of the vehicle, a degree of congestion of traffic, and a condition of a road on which the vehicle travels.

7. The drive assistance device according to claim 1, wherein the microcomputer is further configured to control a notification method for the notification of the switch of the driving modes of the vehicle, and the notification method is controlled based on the detected first condition of the driver.

8. The drive assistance device according to claim 7, wherein the microcomputer is further configured to control the notification method based on time or distance to switch the vehicle from the automatic driving mode to a manual driving mode.

9. The drive assistance device according to claim 7, wherein the microcomputer is further configured to:

use a plurality of notification methods for the notification of the switch of the driving modes of the vehicle; and combine the plurality of notification methods based on no margin in time or no margin in distance to switch the vehicle from the automatic driving mode to a manual driving mode.

10. The drive assistance device according to claim 9, wherein the microcomputer is further configured to notify the switch of the driving modes of the vehicle based on at least two out of audio output, image display, presentation of a kinesthetic sense and a tactile sense, and an information terminal held by the first passenger of the vehicle.

11. The drive assistance device according to claim 1, wherein the microcomputer is further configured to:

control the condition detector to detect a second condition of the driver after the notification of the switch of the driving modes of the vehicle; and control the switch of the driving modes of the vehicle based on the second condition of the driver.

12. The drive assistance device according to claim 1, wherein the microcomputer is further configured to set a third timing to switch the vehicle from the automatic driving mode to a manual driving mode based on a request from the driver.

13. The drive assistance device according to claim 1, wherein the microcomputer is further configured to communicate information to a surrounding vehicle or an external device, and the information indicates the switch of the vehicle from the automatic driving mode to a manual driving mode.

14. A drive assistance method, comprising:

detecting a condition of a driver in an automatic driving mode of a vehicle;

controlling a first timing of a notification of switching of driving modes of the vehicle, wherein the control of the first timing is based on the detected condition of the driver, and the driver corresponds to a first passenger of the vehicle;

notifying the switching of the driving modes of the vehicle to the first passenger at the first timing;

setting a second passenger of the vehicle as a new driver of the vehicle based on no reaction of the first passenger to the notification of the switching of the driving modes of the vehicle;

detecting a condition of the new driver; and controlling, based on the detected condition of the new driver, a second timing of the notification of the switching of the driving modes of the vehicle.

15. A moving body, comprising:

a condition detector configured to detect a condition of a driver in an automatic driving mode of the moving body; and a microcomputer configured to:

control a driving system to drive the moving body to travel in one of a plurality of driving modes;

control a first timing of a notification of switch of the plurality of driving modes, wherein the control of the first timing is based on the detected condition of the driver, and the driver corresponds to a first passenger of the moving body;

notify the switch of the plurality of driving modes to the first passenger at the first timing; and set a second passenger of the moving body as a new driver of the moving body based on no reaction of the first passenger to the notification of the switch of the plurality of driving modes, wherein the condition detector is further configured to detect a condition of the new driver, and the microcomputer is further configured to control, based on the detected condition of the new driver, a second timing of the notification of the switch of the plurality of driving modes.

* * * * *